US007642669B2

(12) United States Patent
Spurr

(10) Patent No.: US 7,642,669 B2
(45) Date of Patent: Jan. 5, 2010

(54) ELECTRICAL CIRCUIT ARRANGEMENT

(75) Inventor: Nigel Spurr, Solihull (GB)

(73) Assignee: Meritor Technology, Inc., Troy, MI (US)

( * ) Notice: Subject to any disclaimer, the term of this patent is extended or adjusted under 35 U.S.C. 154(b) by 287 days.

(21) Appl. No.: 11/768,359

(22) Filed: Jun. 26, 2007

(65) Prior Publication Data

US 2008/0000711 A1 Jan. 3, 2008

(30) Foreign Application Priority Data

Jun. 29, 2006 (GB) ................................ 0612879.7

(51) Int. Cl.
*B60L 1/00* (2006.01)
*H02J 9/00* (2006.01)
*B60R 25/00* (2006.01)

(52) U.S. Cl. ......................... 307/9.1; 307/10.1; 307/64; 200/43.05; 70/237

(58) Field of Classification Search .................. 307/9.1, 307/10, 1, 46–66, 125; 200/43.05–43.21; 70/237, 263, 271
See application file for complete search history.

(56) References Cited

U.S. PATENT DOCUMENTS 4,725,916 A * 2/1988 Oshikiri ...................... 361/104
5,497,641 A 3/1996 Linde et al.
5,547,208 A 8/1996 Chappell et al.
5,827,149 A * 10/1998 Sponable ..................... 477/92
6,345,522 B1 * 2/2002 Stillwagon et al. ............ 70/277
6,883,839 B2 * 4/2005 Belmond et al. ............ 292/201
2005/0104382 A1 5/2005 Schupp
2005/0127687 A1 6/2005 Dimig

FOREIGN PATENT DOCUMENTS

WO 2005/047628 5/2005

OTHER PUBLICATIONS

United Kingdom Search Report dated Jun. 26, 2007.

* cited by examiner

*Primary Examiner*—Albert W Paladini
(74) *Attorney, Agent, or Firm*—Carlson, Gaskey & Olds

(57) ABSTRACT

An electrical circuit arrangement includes an unlatching actuator, a primary power source and a secondary power source. The electrical circuit arrangement further includes an operator actuated switch and an electrically controlled bypass switch having an energized condition at which the bypass switch adopts a first switching configuration and a de-energized condition at which the bypass switch adopts a second switching configuration. The circuit has a first configuration in which the bypass switch is in the first switching configuration so that the primary power source, the operator actuated switch, the bypass switch and the unlatching actuator are configured so that actuation of the operator actuated switch causes the unlatching actuator to be energized by the primary power source. The circuit has a second configuration in which the bypass switch is in the second switching configuration so that the secondary power source, the operator actuated switch, the bypass switch and the unlatching actuator are configured so that actuation of the operator actuated switch causes the unlatching actuator to be energized by the secondary power source.

23 Claims, 2 Drawing Sheets

ELECTRICAL CIRCUIT ARRANGEMENT

REFERENCE TO RELATED APPLICATIONS

This application claims priority to United Kingdom Patent Application GB 0612879.7 filed on Jun. 29, 2006.

BACKGROUND OF THE INVENTION

The present invention relates to an electric circuit arrangement for operating an unlatching actuator. The unlatching actuator may unlatch a door latch, in particular a vehicle door latch, more particularly a land vehicle door latch, such as a car passenger door.

Vehicle door latches with an electric control are known. International patent application number PCT/CA2004/001958 shows an electronic latch arrangement in which power from a main power source is used to unlatch vehicle doors via an unlatching actuator. In the event that the main power source becomes disconnected from the unlatching actuator (such as following a vehicle crash), the power required for unlatching is drawn from a back-up battery contained within the circuit. The circuit further includes a bank of capacitors connected between the main power source, the back-up battery and a motor which drives the unlatching actuator. Under normal conditions, the capacitors are charged by the main power source, and in the "emergency" condition (e.g., following a crash), the capacitors are charged by the back-up battery. Whenever unlatching is required, be it under normal or "emergency" conditions, the energy required by the motor to drive the unlatching actuator is provided by discharging the capacitors. In other words, the motor is directly connected to the capacitors, but is not directly connected to or directly powered by the main battery or the back-up battery. During the act of unlatching, energy is only ever drawn from the capacitor. During unlatching, no energy is drawn from the main power source or from the back-up battery. Power is only drawn from the main power source or from the back-up battery at times other than when unlatching is occurring. This is because it is not possible to simultaneously discharge the capacitor for unlatching and recharging.

The electronic circuit of PCT/CA2004/001958 further includes a microcontroller which controls the components of the circuit, as well as receiving signals from the inside and outside door handles of the vehicle, for example. Under normal conditions, the microcontroller draws a current from the main power source. Under "emergency" conditions, the microcontroller continues to draw a current, initially from the capacitors, and then from a regulator. The microcontroller is therefore operational under both normal and "emergency" conditions and is thus safety critical. If, as a result of a vehicle crash, the microcontroller is damaged and rendered inoperative, it will not be possible to electrically release the doors because the release signal (as generated by operating either the inside door handle or the outside door handle) is transmitted via the microcontroller.

SUMMARY OF THE INVENTION

According to the present invention, there is provided an electric circuit arrangement including an unlatching actuator, a primary power source and a secondary power source. The electrical circuit arrangement further includes an operator actuated switch and an electrically controlled bypass switch having an energized condition at which the bypass switch adopts a first switching configuration and a de-energized condition at which the bypass switch adopts a second switching configuration. The circuit has a first configuration in which the bypass switch is in the first switching configuration so that the primary power source, the operator actuated switch, the bypass switch and the unlatching actuator are configured so that actuation of the operator actuated switch causes the unlatching actuator to be energized by the primary power source. The circuit has a second configuration in which the bypass switch is in the second switching configuration so that the secondary power source, the operator actuated switch, the bypass switch and the unlatching actuator are configured so that actuation of the operator actuated switch causes the unlatching actuator to be energized by the secondary power source.

The electric circuit arrangement of the present invention includes two power sources: a primary power source for unlatching under normal conditions and a secondary or back-up power source for unlatching under "emergency" conditions i.e., when the primary power source is inoperable, such as might occur following a vehicle crash.

BRIEF DESCRIPTION OF THE DRAWINGS

The invention will now be described, by way of example only, with reference to the accompanying drawings in which.

DETAILED DESCRIPTION OF THE PREFERRED EMBODIMENT

Figure 1:
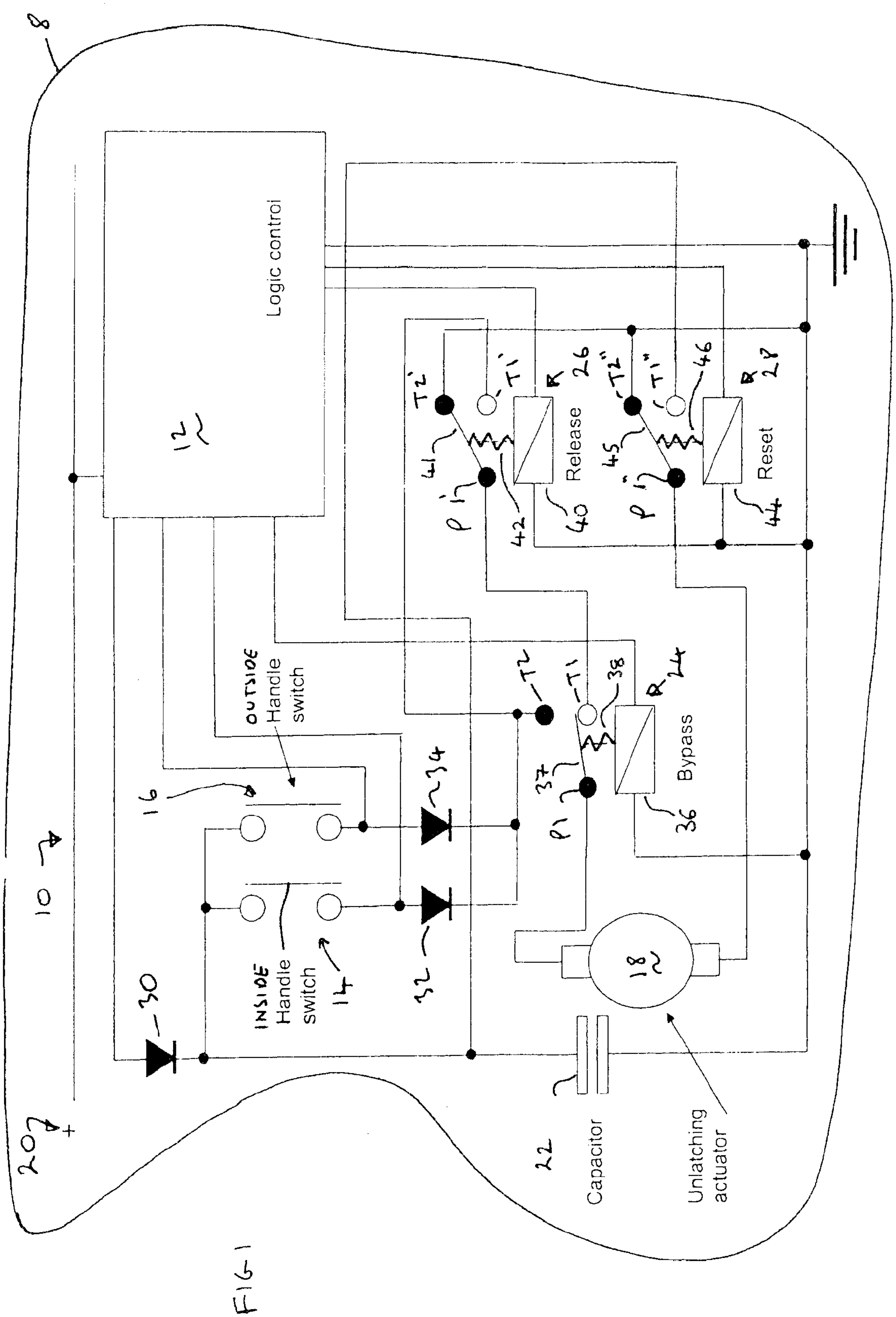
FIG. 1 shows an electric circuit arrangement according to the present invention in a first configuration.
Figure 2:
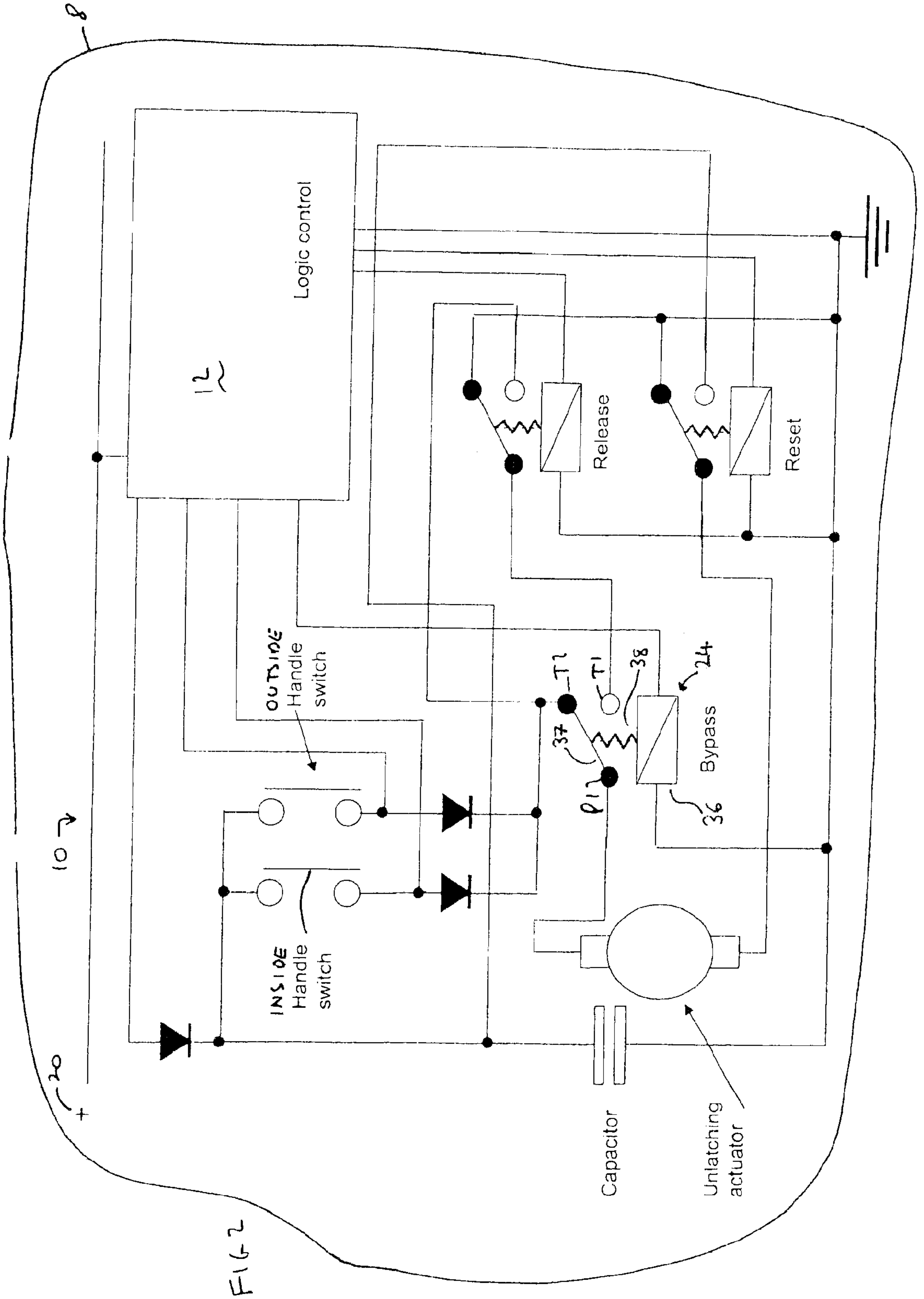
FIG. 2 shows the electric circuit arrangement of FIG. 1 in a second configuration.

With reference to FIGS. 1 and 2, there is shown an electric circuit arrangement 10, the major components of which are a logic controller 12, an inside handle switch 14, an outside handle switch 16, an unlatching actuator 18, a primary power source 20, a secondary power source 22 in the form of a capacitor, a bypass switch 24, a release switch 26 and a reset switch 28. The components are mounted on a vehicle 8 (shown schematically).

The logic controller 12 controls the bypass switch 24, the release switch 26 and the reset switch 28 and receives signals from the inside handle switch 14 and the outside handle switch 16, as will be described below.

The inside handle switch 14 will typically be mounted within easy reach of a vehicle occupant when seated. The inside handle switch 14 may be mounted on the door adjacent to the seat or alternatively can be mounted on some fixed structure of the vehicle 8. The outside handle switch 16 will typically be mounted on or adjacent an associated door.

The unlatching actuator 18 will typically be mounted adjacent an associated latch (not shown). The latch and an associated striker (not shown) will together enable an associated door to be releasably closed. The latch may be mounted on the door with the striker being mounted on adjacent fixed structure of the vehicle, such as a B post or a C post, or alternatively the striker may be mounted on the door and the latch may be mounted on adjacent fixed structure of the vehicle. Unlatching actuators, their associated latches, the associated striker, and their positioning on associated doors is well known and will not be further described.

The primary power source 20 will typically be a vehicle main battery. Alternatively, or additionally, the primary power source 20 may include a generator, such as an engine driven alternator. The secondary power source 22 in this case is a capacitor, though in further embodiments it could be an alternative power source, such as a battery. The secondary power source is preferably charged by the primary power source 20.

The bypass switch 24 is an electrically controlled switch having a pole P1 and terminals T1 and T2. When the bypass switch 24 is energized (as will be described below), the bypass switch 24 adopts a first switching condition in which the pole P1 is electrically connected to the terminal T1 (as shown in FIG. 1). When operation of the inside door handle or the outside door handle is sensed, the unlatching actuator 18 will draw current from the logic controller 12 through the terminal T1 of the bypass switch 24, thereby enabling unlatching.

When the bypass switch 24 is de-energized (as described below), it adopts a second switching condition in which the pole P1 is electrically connected to the terminal T2 (as shown in FIG. 2). When operation of the inside door handle or the outside door handle is sensed, the unlatching actuator 18 will draw current from the secondary power source 22, in this case the capacitor, through the terminal T2 of the bypass switch 24, thereby enabling unlatching.

The terminals T1 and T2 therefore both connect components within the circuit, and in both of the switching conditions described above, the bypass switch 24 acts to complete a circuit. The bypass switch 24 may be a relay.

As shown schematically in FIGS. 1 and 2 in which the bypass switch 24 is a relay, the relay consists of a coil 36, a contact 37 which connects the pole P1 to either the terminal T1 or T2, and a spring 38 which biases the contact 37 towards the terminal T2. When the bypass switch 24 is energized, current flows through the coil 36, thereby generating a magnetic field which causes the contact 37 to connect to the terminal T1 against the biasing action of the spring 38. The spring 38 is selected to be of a resilience such that it is overcome by the strength of the magnetic field when the bypass switch 24 is energized. When bypass switch 24 is de-energized, no current flows through the coil 36 and therefore no magnetic field is generated. In the absence of a magnetic field, the contact 37 connects to the terminal T2 under the biasing action of the spring 38.

Under normal conditions, the bypass switch 24 is energized by the logic controller 12, and the bypass switch 24 adopts the first switching condition. That is, the contact 37 connects the pole P1 to the terminal T1. Under "emergency" conditions, the bypass switch 24 is de-energized, and the bypass switch 24 adopts the second switching condition. That is, the contact 37 connects the pole P1 to the terminal T2.

The release switch 26 and the reset switch 28 are similar to the bypass switch 24 and include poles P1' and P2', respectively, and terminals, T1', T2', T1", T2", respectively. The release switch 26 and the reset switch 28 may also be relays, and are shown schematically in FIGS. 1 and 2. The release switch 26 includes a coil 40, a contact 41 and a spring 42. The reset switch 28 includes a coil 44, a contact 45 and a spring 46.

When the release switch 26 is energized by the logic controller 12, current flows through the coil 40, thereby generating a magnetic field which causes the contact 41 to connect to the terminal T1' against the biasing action of the spring 42. When the release switch 26 is de-energized, no current flows through the coil 40 so no magnetic field is generated, and the contact 41 connects to the terminal T2' under the biasing action of the spring 42.

When the reset switch 28 is energized by the logic controller 12, current flows through the coil 44, thereby generating a magnetic field which causes the contact 45 to connect to the terminal T1", against the biasing action of the spring 46. When the reset switch 28 is de-energized, no current flows through the coil 44 so no magnetic field is generated, and the contact 45 connects to the terminal T2" under the biasing action of the spring 46.

The bypass switch 24, the release switch 26 and the reset switch 28 are not limited to relays. Any kind of switch which adopts a first position when energized and a second position when de-energized may be used.

The electric circuit arrangement 10 also includes unidirectional electrical devices, in this case diodes 30, 32 and 34.

In summary, in normal operation, access to and egress from the vehicle 8 is controlled by the logic controller 12. The vehicle 8 can have different security statuses. For example, the vehicle 8 can be locked, in which case actuation of the outside handle switch 16 will not cause actuation of the unlatching actuator 18, but actuation of the inside handle switch 14 will cause actuation of the unlatching actuator 18. Examples of other security statuses are superlocked (also known as deadlocked), unlocked, child safety on, child safety off. Such security statuses are well known to those skilled in the art and will not be described further here.

Under normal operation, the primary power source 20 is available for use and as such the bypass switch 24 is energized by the logic controller 12 and adopts the first switching condition, shown in FIG. 1. Under these circumstances, operation of the inside handle switch 14 or the outside handle switch 16 relies on the logic controller 12 controlling the release switch 26 in an appropriate manner (dependent upon the security status) to operate the unlatching actuator 18.

However, in the event of electrical failure of the primary power source 20 and/or in the event of an electrical malfunction of the logic controller 12, the bypass switch 24 is de-energized (i.e., it is no longer energized by the logic controller 12), and the bypass switch 24 automatically adopts the second switching configuration shown in FIG. 2. Under these circumstances, operation of either the inside handle switch 14 or the outside handle switch 16 allows the secondary power source 22 to discharge through the unlatching actuator 18 and hence release the associated latch. Such releasing of the latch is independent of the primary power source 20 and is also independent of the logic controller 12.

In both normal and "emergency" unlatching as described above, the power is drawn from one of the primary power source 20 and the secondary power source 22 and is fed directly to the unlatching actuator 18.

That is, the power released from the primary power source 20 or the secondary power source 22, in this case the capacitor, is not fed to an intermediate storage device, for example a further capacitor for subsequent use when releasing the latch. Therefore, when the electric circuit arrangement 10 is in the first configuration, the primary power source 20 directly powers the unlatching actuator 18. When the electric circuit arrangement 10 is in the second configuration, the secondary power source 22 directly powers the unlatching actuator 18.

In more detail, FIG. 1 shows the system in normal operation when the primary power source 20 is available at a power source, and the logic controller 12 is operating correctly. Under these circumstances, the logic controller 12 energizes the bypass switch 24 such that the pole P1 is connected to the terminal T1.

Both the release switch 26 and the reset switch 28 are de-energized and hence the pole P1' is connected to the terminal T2' (in view of the biasing action of the spring 42) and the pole P1" is connected to the terminal T2" (in view of the biasing action of the spring 46).

The inside handle switch 14 and the outside handle switch 16 are both in an open circuit position. The secondary power source 22 is charged by the primary power source 20. The logic controller 12 has predetermined security statuses, and the vehicle operator can select one of the predetermined security statuses.

When the predetermined security status selected is "unlocked, child safety off", then actuation of either the inside handle switch 14 or the outside handle switch 16 will cause "normal" unlatching of the latch as follows.

In the event that the inside handle switch 14 is operated, then such operation can be determined by the logic controller 12. In particular, the diodes 32 and 34 enable the logic controller 12 to determine which of the inside handle switch 14 or the outside handle switch 16 have been operated. The logic controller 12 compares the operation of the switch with the current security status of the latch to determine whether or not to energize the release switch 26. In the present example, with the security status being "unlocked" and with the inside handle switch being operated, the logic controller 12 will energize the coil 40 of the release switch 26, thereby momentarily connecting the terminal T1' to the pole P1'. This allows the unlatching actuator 18 to be energized by the primary power source 20, thereby unlatching the latch and enabling the door to be opened. Once the latch has been opened, the logic controller 12 then de-energizes the coil 40 of the release switch 26 and energizes the coil 44 of the reset switch 28 to return the release actuator to the rest position. The reset switch 28 is only energized for sufficient time to reset the unlatching actuator 18 and is then de-energized by the logic controller 12. Subsequent closing of the door will then relatch the latch.

In particular, during the whole of the above mentioned "normal" latch opening sequence, the secondary power source 22, in this case capacitor, remains charged. That is, none of the power required by the unlatching actuator 18 is taken from the secondary power source 22 under "normal" conditions. In other words, during "normal" unlatching, the secondary power source 22 is not discharged.

In the event that the primary power source 20 fails or the logic controller 12 fails (perhaps as a result of a road traffic accident), then the electric circuit arrangement 10 adopts the configuration as shown in FIG. 2. In particular, because the bypass switch 24 is not energized by the logic controller 12, then the bypass switch 24 adopts the second switching configuration, as shown in FIG. 2 wherein the pole P1 is connected to the terminal T2.

Under these circumstances, actuation of either the inside handle switch 14 or the outside handle switch 16 causes the secondary power source 22 to be connected directly to the unlatching actuator 18 thereby releasing the latch. Note that releasing the latch in this "emergency" mode is independent of the primary power source 20 and is also independent of the logic controller 12. The logic controller 12 therefore does not draw any power from either the primary power source 20 or the secondary power source during "emergency" unlatching.

Furthermore, during "emergency" unlatching, the logic controller 12 plays no part in determining whether the inside door handle or the outside door handle have been operated, because in this situation the logic controller 12 is bypassed because the contact 37 of the bypass switch 24 is connected to the terminal T2. Therefore, during "emergency" unlatching, the logic controller 12 plays no part.

The primary power source 20 and the logic controller 12 are therefore not "safety critical" components, so if they malfunction as the result of a crash, for example, the vehicle doors can still be unlatched using power from the secondary power source 22.

Where the secondary power source 22 is a capacitor, this "emergency" configuration will typically give a "one shot" operation of the unlatching actuator 18. However, where the secondary power source 22 is a battery, the unlatching actuator 18 can be actuated more than once.

In some embodiments, when the vehicle 8 is parked and left unattended, the system may be configured to adopt the configuration as shown in FIG. 2, i.e., the bypass switch 24 may not be energized in order to prevent depletion of the primary power source 20 when the primary power source 20 is a battery. Under these circumstances, it is preferable to discharge the secondary power source 22 when it is a capacitor. Thus, when a vehicle operator parks the car and locks the doors, the logic controller 12 can additionally cause the capacitor to be drained. One way of draining the capacitor is to momentarily energize the reset switch 28, thereby draining the capacitor through the unlatching actuator 18 without actuating the latch.

Where the secondary power source 22 is a battery, the logic controller 12 can operate a switch (not shown) to isolate this secondary power source 22.

This system is particularly applicable to the vehicle door latch system where a manual unlatching mechanism (such as the inside door handles and the outside door handles) are not present. Under these circumstances, it is necessary to ensure that the vehicle 8 can be unlatched in the event of a power failure while driving and that the control device, such as the logic controller 12, cannot cause involuntary unlatching to take place. Under such circumstances, the security statuses can be determined by the software within the logic controller 12.

Security statuses can be as follows

Front door: (i.e., no child safety requirement) unlocked, locked, and superlocked.

Rear door: (child safety required) unlocked child safety off, unlocked child safety on, locked child safety off, locked child safety on, and superlocked.

Not only can the logic controller 12 define security statuses, but it can also define how those statuses change dependent upon actions taken by operators. Thus, typically the security statuses can be initially defined by buttons within the vehicle, or buttons or a sequence of button pushing on a remote locking device such as an infra red key fob device. However, once a security setting has been defined by such a device, that security setting can be changed either operation of the remote device or switches within the vehicle or alternatively the setting can be changed by operation of an inside handle or an outside handle.

Thus, "override unlocking" operation can be provided for. Thus, with a front door which is locked, operation of the outside switch will not open the door, but operation of the inside switch will open the door. If the logic controller 12 is configured to provide override unlocking, then, starting with the locked front door, operation of the inside handle will open the door, but will also change status of that door to unlocked so that when the door is subsequently closed, it is not locked. This is traditionally provided to ensure that keys or the like do not inadvertently get locked in the vehicle.

Alternatively, consider a locked rear door with child safety on versus the same door being superlocked. As far as superlocked is concerned, any number of operations of the outside door handle or any number of operations of the inside door handle in any order will not unlatch the door. Contrast this with the same door being locked with child safety on and with an "override unlocking system" in operation. With the door locked and child safety on, any number of operations of just the outside handle switch 16 will not open the door. Similarly, any number of operations of just the inside handle switch 14 will not open the door. However, while one operation of the inside handle switch 14 will not open the door, nevertheless the logic controller 12 can be configured to change the lock status to unlocked upon operation of the inside handle switch 14. Thus, starting with the door in a locked child safety on condition, one operation of the inside handle switch 14 followed by one operation of the outside handle switch 16 will open the door and this is useful under certain circumstances.

Because the system allows the opening of the door in the event of failure of the logic controller 12 and/or failure of the primary power source 20, the primary power source 20 and the logic controller 12 are significantly less safety critical than would otherwise be the case.

FIGS. 1 and 2 show a vehicle 8 having an electric circuit arrangement 10 for controlling an unlatching actuator 18 associated with a latch of a door having an associated inside handle switch and an outside handle switch 16.

Where the vehicle 8 has more than one door, each door may have electric circuit arrangement 10 shown in FIGS. 1 and 2. However, where a vehicle 8 has a plurality of doors, it is advantageous for the primary power source 20 to be common to all doors. It is also advantageous for the logic controller 12 to be common to all doors.

The secondary power source 22 may be common to all doors. Alternatively, each door which is equipped with the circuit arrangement of FIGS. 1 and 2 may have a dedicated secondary power source 22.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. An electrical circuit arrangement comprising:
- an unlatching actuator;
- a primary power source;
- a secondary power source;
- an electrically controlled bypass switch having an energized condition at which the electrically controlled bypass switch adopts a first switching configuration and a de-energized condition at which the electrically controlled bypass switch adopts a second switching configuration; and
- an operator actuated switch,
- wherein the electrical circuit arrangement has a first configuration in which the electrically controlled bypass switch is in the first switching configuration with the primary power source, the operator actuated switch, the electrically controlled bypass switch and the unlatching actuator configured so that actuation of the operator actuated switch causes the unlatching actuator to be energized by the primary power source, and
- wherein the electrical circuit arrangement has a second configuration in which the electrically controlled bypass switch is in the second switching configuration with the secondary power source, the operator actuated switch, the electrically controlled bypass switch and the unlatching actuator configured so that actuation of the operator actuated switch causes the unlatching actuator to be energized by the secondary power source.

2. The electrical circuit arrangement as defined in claim 1 wherein the primary power source is one of a battery and a generator.

3. The electrical circuit arrangement as defined in claim 1 wherein the secondary power source is a battery.

4. The electrical circuit arrangement as defined in claim 1 wherein the secondary power source is a capacitor.

5. The electrical circuit arrangement as defined in claim 1 wherein the secondary power source is charged by the primary power source.

6. The electrical circuit arrangement as defined in claim 1 wherein the secondary power source remains charged during unlatching when the electrical circuit arrangement is in the first configuration.

7. The electrical circuit arrangement as defined in claim 1 wherein the electrically controlled bypass switch is a relay.

8. The electrical circuit arrangement as defined in claim 1 wherein, when the electrical circuit arrangement is in the second configuration, unlatching is independent of the primary power source.

9. The electrical circuit arrangement as defined in claim 1 including a logic controller which selectively energizes the electrically controlled bypass switch.

10. The electrical circuit arrangement as defined in claim 9 wherein, when the electrical circuit arrangement is in the second configuration, energizing of the unlatching actuator is independent of the logic controller.

11. The electrical circuit arrangement as defined in claim 9 including an electrically controlled release switch which is selectively energized by the logic controller to energize the unlatching actuator via the primary power source.

12. The electrical circuit arrangement as defined in claim 11 wherein the release switch is selectively energized by the logic controller on receipt of an actuation signal from the operator actuated switch.

13. An electrical circuit arrangement comprising:
- an unlatching actuator;
- a primary power source;
- a secondary power source;
- an electrically controlled bypass switch having an energized condition at which the electrically controlled bypass switch adopts a first switching configuration and a de-energized condition at which the electrically controlled bypass switch adopts a second switching configuration;
- an operator actuated switch;
- a logic controller which selectively energizes the electrically controlled bypass switch; and
- an electrically controlled reset switch which is energized by the logic controller to reset the unlatching actuator following actuation of the unlatching actuator,
- wherein the electrical circuit arrangement has a first configuration in which the electrically controlled bypass switch is in the first switching configuration with the primary power source, the operator actuated switch, the electrically controlled bypass switch and the unlatching actuator configured so that actuation of the operator actuated switch causes the unlatching actuator to be energized by the primary power source, and
- wherein the electrical circuit arrangement has a second configuration in which the electrically controlled bypass switch is in the second switching configuration with the secondary power source, the operator actuated switch, the electrically controlled bypass switch and the unlatching actuator configured so that actuation of the operator actuated switch causes the unlatching actuator to be energized by the secondary power source.

14. An electrical circuit arrangement comprising:
- an unlatching actuator;
- a primary power source;

a secondary power source;

an electrically controlled bypass switch having an energized condition at which the electrically controlled bypass switch adopts a first switching configuration and a de-energized condition at which the electrically controlled bypass switch adopts a second switching configuration;

an operator actuated switch; and a logic controller which selectively energizes the electrically controlled bypass switch, wherein the logic controller has a plurality of preset security statuses, wherein the electrical circuit arrangement has a first configuration in which the electrically controlled bypass switch is in the first switching configuration with the primary power source, the operator actuated switch, the electrically controlled bypass switch and the unlatching actuator configured so that actuation of the operator actuated switch causes the unlatching actuator to be energized by the primary power source, and wherein the electrical circuit arrangement has a second configuration in which the electrically controlled bypass switch is in the second switching configuration with the secondary power source, the operator actuated switch, the electrically controlled bypass switch and the unlatching actuator configured so that actuation of the operator actuated switch causes the unlatching actuator to be energized by the secondary power source.

15. The electrical circuit arrangement as defined in claim 14 wherein a security status of the logic controller can be changed by operation of the operator actuated switch.

16. The electrical circuit arrangement as defined in claim 14 wherein the secondary power source is a capacitor, the plurality of preset security statuses include at least one of locked and superlocked, and the logic controller discharges the capacitor when a security status of the logic controller is set to one of locked and superlocked.

17. The electrical circuit arrangement as defined in claim 16 wherein the capacitor is discharged through the unlatching actuator.

18. The electrical circuit arrangement as defined in claim 17 wherein the capacitor is discharged through a reset switch.

19. The electrical circuit arrangement as defined in claim 14 wherein the plurality of preset security statuses includes at least one of locked and superlocked, and the logic controller operates to isolate the secondary power source from the unlatching actuator when a security status of the logic controller is set to one of locked and superlocked.

20. An electrical circuit arrangement comprising:

an unlatching actuator;

a primary power source;

a secondary power source;

an electrically controlled bypass switch having an energized condition at which the electrically controlled bypass switch adopts a first switching configuration and a de-energized condition at which the electrically controlled bypass switch adopts a second switching configuration;

an operator actuated switch; and a further operator actuated switch, wherein the electrical circuit arrangement has a first configuration in which the electrically controlled bypass switch is in the first switching configuration with the primary power source, the operator actuated switch, the electrically controlled bypass switch and the unlatching actuator configured so that actuation of the operator actuated switch causes the unlatching actuator to be energized by the primary power source, and wherein the electrical circuit arrangement has a second configuration in which the electrically controlled bypass switch is in the second switching configuration with the secondary power source, the operator actuated switch, the electrically controlled bypass switch and the unlatching actuator configured so that actuation of the operator actuated switch causes the unlatching actuator to be energized by the secondary power source, wherein the electrical circuit arrangement has a further first configuration in which the electrically controlled bypass switch is energized to adopt the first switching configuration, and the primary power source, the further operator actuated switch, the electrically controlled bypass switch and the unlatching actuator are configured so that actuation of the further operator actuated switch selectively causes the unlatching actuator to be energized by the primary power source, and wherein the electrical circuit arrangement has a further second configuration in which the electrically controlled bypass switch is de-energized to adopt the second switching condition, and the secondary power source, the further operator actuated switch, the electrically controlled bypass switch and the unlatching actuator are configured so that actuation of the further operator actuated switch causes the unlatching actuator to be energized by the secondary power source.

21. A vehicle including an electric circuit arrangement, the vehicle comprising:

an electric circuit arrangement including:

an unlatching actuator, a primary power source, a secondary power source, an electrically controlled bypass switch having an energized condition at which the electrically controlled bypass switch adopts a first switching configuration and a de-energized condition at which the electrically controlled bypass switch adopts a second switching configuration, an operator actuated switch, and a further operator actuated switch, wherein the electrical circuit arrangement has a first configuration in which the electrically controlled bypass switch is in the first switching configuration with the primary power source, the operator actuated switch, the electrically controlled bypass switch and the unlatching actuator configured so that actuation of the operator actuated switch causes the unlatching actuator to be energized by the primary power source, wherein the electrical circuit arrangement has a second configuration in which the electrically controlled bypass switch is in the second switching configuration with the secondary power source, the operator actuated switch, the electrically controlled bypass switch and the unlatching actuator configured so that actuation of the operator actuated switch causes the unlatching actuator to be energized by the secondary power source, wherein the electrical circuit arrangement has a further first configuration in which the electrically controlled bypass switch is energized to adopt the first switching configuration, and the primary power source, the further operator actuated switch, the electrically controlled bypass switch and the unlatching actuator are configured so that actuation of the further operator actuated switch selectively causes the unlatching actuator to be energized by the primary power source, wherein the electrical circuit arrangement has a further second configuration in which the electrically controlled bypass switch is de-energized to adopt the second switching condition, and the secondary power source, the further operator actuated switch, the electrically controlled bypass switch and the unlatching actuator are configured so that actuation of the further operator actuated switch causes the unlatching actuator to be energized by the secondary power source, and wherein one of the operator actuated switch and the further operator actuated switch is positioned on an inside of the vehicle and the other of the operator actuated switch and the further operator actuated switch is positioned on an outside of the vehicle.

22. An electrical circuit arrangement comprising:

an unlatching actuator;

a primary power source;

a secondary power source;

an electrically controlled bypass switch having an energized condition at which the electrically controlled bypass switch adopts a first switching configuration and a de-energized condition at which the electrically controlled bypass switch adopts a second switching configuration; and an operator actuated switch, wherein power from the primary power source passes through the electrically controlled bypass switch as a result of actuation of the operator actuated switch, wherein the electrical circuit arrangement has a first configuration in which the electrically controlled bypass switch is in the first switching configuration with the primary power source, the operator actuated switch, the electrically controlled bypass switch and the unlatching actuator configured so that actuation of the operator actuated switch causes the unlatching actuator to be energized by the primary power source, and wherein the electrical circuit arrangement has a second configuration in which the electrically controlled bypass switch is in the second switching configuration with the secondary power source, the operator actuated switch, the electrically controlled bypass switch and the unlatching actuator configured so that actuation of the operator actuated switch causes the unlatching actuator to be energized by the secondary power source.

23. An electrical circuit arrangement comprising:

an unlatching actuator;

a primary power source;

a secondary power source;

an electrically controlled bypass switch having an energized condition at which the electrically controlled bypass switch adopts a first switching configuration and a de-energized condition at which the electrically controlled bypass switch adopts a second switching configuration; and an operator actuated switch, wherein power from the secondary power source passes through the electrically controlled bypass switch as a result of actuation of the operator actuated switch, wherein the electrical circuit arrangement has a first configuration in which the electrically controlled bypass switch is in the first switching configuration with the primary power source, the operator actuated switch, the electrically controlled bypass switch and the unlatching actuator configured so that actuation of the operator actuated switch causes the unlatching actuator to be energized by the primary power source, and wherein the electrical circuit arrangement has a second configuration in which the electrically controlled bypass switch is in the second switching configuration with the secondary power source, the operator actuated switch, the electrically controlled bypass switch and the unlatching actuator configured so that actuation of the operator actuated switch causes the unlatching actuator to be energized by the secondary power source.

* * * * *